Patented June 4, 1935

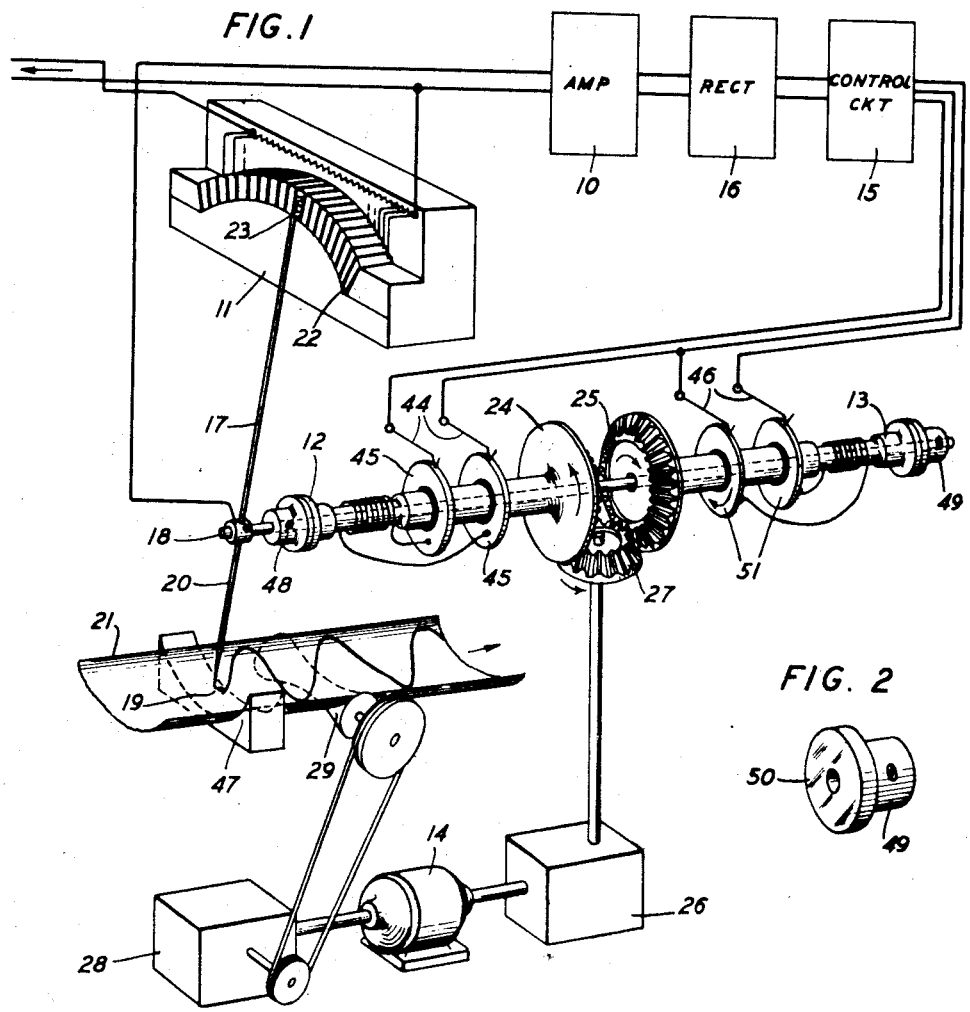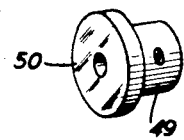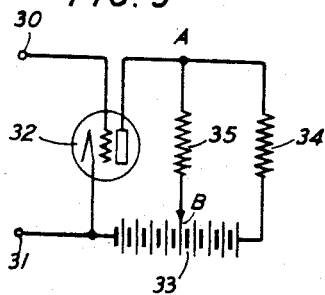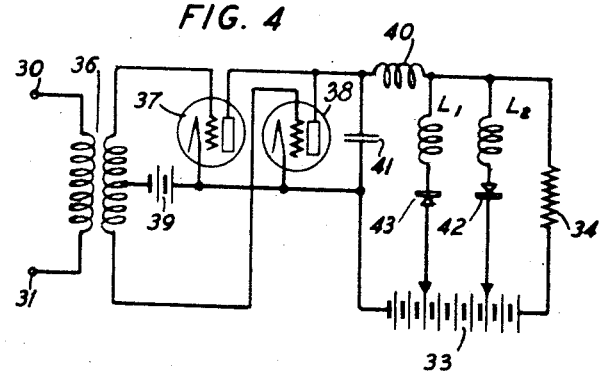

2,003,913

UNITED STATES PATENT OFFICE 2,003,913

POSITION CONTROLLING DEVICE

Edward C. Wente, New York, N. Y., assignor to Bell Telephone Laboratories, Incorporated, New York, N. Y., a corporation of New York Application December 1, 1933, Serial No. 700,548

7 Claims. (Cl. 179—175.3)

This invention relates to devices for controlling the position of a movable member as determined either arbitrarily or in accordance with variable quantities.

The object of the invention is a device, the control of the movable member of which can be effected with greater speed than has heretofore been possible.

A feature of the invention is a mechanical construction of the movable member which reduces the inertia of the member to a minimum.

Another feature of the invention is an electrical circuit for controlling the motion of the movable member which provides for a region between two arbitrary values of the variable quantities wherein the movable member is insensitive. This renders the device more accurate since it prevents overshooting and avoids natural oscillation of the movable member when there is no variable quantity affecting it.

Other objects and features will become apparent from the preferred form of the invention to be hereinafter described.

From a mechanical standpoint, the invention comprises, in general, a pair of oppositely rotating electromagnetic clutches, a pair of pole pieces or armatures cooperating with each clutch and secured to a common shaft, and visual recording and current controlling means secured directly to the shaft. Thus all of the movable members of the invention rotate about, and are secured to, a common shaft. The mass and distribution of the members relative to the shaft are such as to reduce the moment of inertia of the members with respect thereto to a minimum, thereby making the moving system susceptible to extremely rapid changes in the varying quantities.

The novel electrical circuit comprises a balanced circuit with two parallel normally neutral paths therein, each containing a coil of an electromagnet. If there were nothing more in each path, on an unbalance of the circuit above a critical value the current would flow in one direction through both paths and on an unbalance below the critical value the current would flow in the opposite direction, through both paths. In each path, however, is a unidirectional current passing element, and each element passes a current in a direction opposite to the other so that one electromagnet is energized when the unbalance is above the critical value and the other when the unbalance is below that value.

Instead of a single critical value a critical zone is provided by inserting a small electromotive force in series with both paths.

Referring to the drawing, now, for a more detailed description of an illustrative circuit and apparatus:

Fig. 1 is a perspective of the mechanical features of this invention;

Fig. 2 is a perspective of the armature of an electromagnet;

Fig. 3 is an elementary circuit illustrating the principle of the invention; and Fig. 4 is a circuit which may be used with the position controlling device.

The device chosen to illustrate this invention is known as an automatic volume level recorder, and its function is to plot continuously, on a moving paper or other medium, a curve, the ordinate of which is proportional to the logarithm of the electrical input furnished to it.

In Fig. 1, an amplifier 10 is arranged so that its gain is controlled by an attenuator or potentiometer 11 which, in turn, is controlled by two electromagnetic clutches 12 and 13 driven by a motor 14. Electrical contact is made with the coils of electromagnetic clutches 12 and 13 by means of slip rings 45 and brushes 44 and slip rings 51 and brushes 46, respectively. A current in the winding of clutch 12 causes the potentiometer 11 to vary in a manner which increases the gain of amplifier 10 and a current in the winding of clutch 13 in the manner which decreases the gain in that amplifier. The output of amplifier 10 is fed into a clutch control circuit 15 through a suitable rectifier 16. The clutch control circuit 15 is so designed that if the output of amplifier 10 is below a certain arbitrary level, clutch 12 will receive an energizing current, or if above that level, clutch 13 will come into play. The potentiometer arm 17 is mounted on a shaft 18 which is rotated by clutches 12 and 13 and which also carries a stylus 19 mounted on a similar arm 20 for the purpose of making a curve on a moving paper or other medium 21. The displacement of the curve from an arbitrary ordinate represents the amount the gain of the amplifier had to be changed to keep the output constant, which is exactly a measure of the input to the amplifier on a decibel scale provided, however, that the potentiometer 11 is logarithmic. This logarithmic action is obtained by dividing the total resistance of the potentiometer 11 into a series of steps each of which represents a loss of a given number of decibels. Each such step terminates in a silver segment 22 and the group of segments representing the potentiometer are arranged along an arc described by contact 23 at the end of potentiometer arm 17. The steps may represent equal increments of one-half decibel each, and the segment block may be made removable so that other blocks with different increments may be substituted for the one-half decibel block.

The uses to which a device of the type described can be put depend to a large extent upon the rapidity with which the stylus of the device can be made to move. This motion of the stylus is known as the pen speed and can be defined as the maximum rate at which a motor driven attenuator can change the gain of the amplifier with which is cooperates. It is determined in the present device by the rate of rotation of the clutch driving gears 24 and 25 and the mechanical and electrical size of the potentiometer assembly. A high pen speed is necessary where certain types of records are to be taken in less time and where it is desired to record transient phenomena such as the decay of sound in a damped room, which is too rapid to be measured by the average pen.

The device herein described can be designed to operate at a pen speed of 240 decibels per second. This would theoretically permit the machine to record the decay of sound in rooms the reverberation time in which is as short as one-fourth of a second. Lower pen speeds, however, are often desirable and these can be obtained by providing a system of reduction gears 26 between the motor 14 and driving pinion 27 whereby the speed of driving gears 24 and 25 may be changed to any one of several values. Another system of reduction gear 28 can be used between the motor 14 and record drive 29 so that the paper 21 can also be made to move at different speeds.

In designing a recorder for fast pen response the mass of the parts which move with the pen must be reduced to a minimum to lessen the tendency of the parts to persist in motion or overshoot even after the actuating force is removed and thereby give a false indication of the condition of the electrical circuit cooperating therewith. In the present novel device the potentiometer and stylus arms, 17 and 20, respectively, are balanced and comprise hollow nickel shells made by electroplating nickel over a mandrel of the desired shape and then removing the electroplate from the mandrel. This results in an extremely strong and light arm. The magnets of the clutches rotate continuously and hence can be of such weight as is necessary for the achievement of the desired results. Each clutch armature is slightly over an inch in diameter and its inner face is plated with a light layer of chromium 50 (Fig. 2), which constantly rests against the magnet, with no air gap between the magnet and the chromium. The chromium 50 acts as a non-magnetic separator and permits the clutch to operate with almost no axial motion of the armature. Approximately .0005 amperes is sufficient current for full clutch operation.

For the record, a colored paper which is coated with a different colored composition of wax and soap may be used since it requires no ink, heat or light to make a record thereon, the stylus making its line merely by scratching through the wax surface. The records so obtained are permanent and may be photographed.

Besides lightness in the mechanical recording parts, great stability in the electrical circuit is required for high speed operation. The principle of operation of the novel circuit employed can be understood by reference to Fig. 3. In this figure, 30 and 31 are the input leads to the control circuit, 32 is a rectifier tube, 33 is a source of electromotive force such as a battery, 34 is a resistance in series with the battery and the plate of tube 32, and 35 is a resistance in shunt to resistance 34 and a portion of the battery 33. For a particular value of plate impedance R1 the potential at A will be the same as at B and no current will flow in resistance 35. If the plate impedance increases, current will flow from A to B, and if it decreases, current will flow from B to A.

In Fig. 4 is shown a similar circuit with modifications to adapt it to the purpose under consideration. The input leads 30 and 31 are connected to the primary of a transformer 36, the secondary of which is connected to the grids of two rectifier tubes 37 and 38 arranged to give a full wave rectification of the input current. The grids of the tubes 37 and 38 are biased by a battery 39 connected to the mid tap of the secondary of transformer 36. The plates of the rectifiers are connected in series and a filtering choke 40 and condenser 41 are used in the plate circuit to smooth out the wave. Resistance 35 of Fig. 2 has been replaced by two circuits each containing a unidirectional current passing element 42, 43, such as a copper oxide rectifier, and a clutch winding L1 and L2. If the input is higher than a certain level, the clutch which decreases the amplifier gain, say L1, will draw operating current or, if lower, L2, the gain increasing clutch, will operate. Thus the device always maintains such an input to the amplifier as will keep the plate impedance at a critical value at which neither clutch circuit is energized.

To make the pen control more critical, L1 may be connected to a higher potential than L2 or vice versa. This changes the critical value to a critical zone determined by the difference between the potentials in L1 and L2, and results in such stability and efficiency that at 240 decibels per second pen speed the pen can be controlled to within one-half decibel, which is the size of a step of the motor driven potentiometer 11, without oscillating. The connections to the battery 33 are preferably made variable so that any desired potential difference may be obtained.

The input to the potentiometer 11 may be connected to a microphone and amplifier or to any other sound translating device. It may also be connected to a volume control located at a distant point so that the volume level of a public address system might be adjusted by the distant speaker, performer or orchestra director. It is also possible in a plurality of electrical channels all of which are affected by approximately the same condition to insert a device of the kind described into one of the channels and by means of the one device operate a plurality of potentiometers each of which affects a separate channel, thereby economizing in the number of such devices required to control the entire group of channels.

The surface of the support 47 for the recording paper 21 is concave, the radius of curvature of which is equal to the distance from the center of shaft 18 to the tip of stylus 19. Thus rectangular coordinates can be used on the recording paper 21 without translating the curvilinear motion of stylus 19 into rectilinear motion by means of cumbersome gears and pulleys.

It is understood that the foregoing description is merely illustrative of the invention and that the scope of the invention is not to be limited to the form shown but is to be determined by the appended claims.

What is claimed it:

1. In a circuit for controlling the position of a movable member, a variable impedance, a divided source of electromotive force to give a plurality of voltages, and a fixed resistance, said impedance, source and resistance being in series, a pair of parallel paths in shunt to the impedance and to a division of the electromotive force, an inductance in each path comprising the field coil of an electromagnet adapted to cooperate with the movable member and a unidirectional current passing element in each path, each element being opposed to the other whereby one electromagnet is energized when the impedance exceeds a given value and the other electromagnet is energized when the impedance is below said value.

2. In a circuit for controlling the position of a movable member, a variable impedance, a source of electromotive force divided into three parts to give three voltages, and a fixed resistance, said impedance, source and resistance being in series, a pair of parallel paths, one of said paths being in shunt to the impedance and one division of the electromotive force and the other being in shunt to the impedance and two divisions of the electromotive force, an inductance in each path comprising the field coil of an electromagnet adapted to cooperate with the movable member, and a unidirectional current passing element in each path, each element being opposed to the other, whereby one electromagnet is energized when the impedance exceeds a given value and the other is energized when the impedance is below a value lower than the given value.

3. In a device for recording rapidly varying quantities, said device comprising an amplifier, a potentiometer for varying the gain of the amplifier, a full wave rectifier and a balanced circuit including a pair of electromagnetic clutches, means for continuously rotating the clutches in opposite directions and means for operating the potentiometer to secure a constant level output from the amplifier, said means comprising a shaft extending through the centers of the oppositely rotating electromagnets, armatures secured to the shaft, a non-magnetic separator between each armature and electromagnet and a balanced radial arm secured to the shaft and adapted to cooperate with the potentiometer whereby increases in volume level unbalance the circuit and operate the clutch which rotates the arm to lower the gain of the amplifier, and decreases in volume level operate the clutch which rotates the arm to raise the gain of the amplifier.

4. Apparatus as in claim 3, a moving impressionable medium and a balance for the radial arm comprising a stylus cooperating with the medium to make a record therein of the amount and frequency of the varying quantities.

5. Apparatus controllable by changes in an electrical current comprising a pair of oppositely rotating electromagnets energizable according to the changes in the current and a unitary rotatable mass cooperating therewith, said mass comprising individual armatures cooperating with the electromagnets, a shaft secured to the armature, and a recording stylus secured to the shaft.

6. Apparatus controllable by changes in an electrical current comprising a pair of oppositely rotating electromagnets energizable according to the changes in the current, an armature constantly in light contact with each electromagnet, said armature comprising a magnetizable portion and a thin non-magnetizable portion, said non-magnetizable portion comprising the contacting portion of the armature.

7. In a volume level recorder comprising a pair of oppositely rotating electromagnets, a control circuit for the electromagnets adapted to prevent overshooting of the recorder, said circuit comprising a variable impedance, a resistance in shunt to the impedance, a plurality of variable electromotive forces in series with the impedance and two shunt branches connected to different electromotive forces, each shunt branch comprising a field coil for one of the electromagnets and a unidirectional current passing element, said unidirectional current passing elements being opposed to one another, the difference between the electromotive forces constituting a zone within which the impedance may vary without affecting the recorder.

EDWARD C. WENTE.